(12) United States Patent
Iwatani (10) Patent No.: US 9,657,629 B2
(45) Date of Patent: May 23, 2017

(54) EXHAUST GAS PURIFICATION APPARATUS FOR INTERNAL COMBUSTION ENGINE

(71) Applicant: TOYOTA JIDOSHA KABUSHIKI KAISHA, Toyota-shi, Aichi (JP)

(72) Inventor: Kazuki Iwatani, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/778,492

(22) PCT Filed: Mar. 19, 2014

(86) PCT No.: PCT/JP2014/057511
§ 371 (c)(1),
(2) Date: Sep. 18, 2015

(87) PCT Pub. No.: WO2014/148545
PCT Pub. Date: Sep. 25, 2014

(65) Prior Publication Data
US 2016/0290204 A1  Oct. 6, 2016

(30) Foreign Application Priority Data
Mar. 22, 2013 (JP) .................................. 2013-060714

(51) Int. Cl.
*F01N 3/36* (2006.01)
*F01N 3/10* (2006.01)
(Continued)

(52) U.S. Cl.
CPC ............... *F01N 3/36* (2013.01); *F01N 3/103* (2013.01); *F01N 3/106* (2013.01); *F01N 3/208* (2013.01);
(Continued)

(58) Field of Classification Search
CPC ....... F01N 3/2066; F01N 3/208; F01N 3/0253
(Continued)

(56) References Cited

U.S. PATENT DOCUMENTS

2004/0194451 A1  10/2004  Kawatani et al.
2010/0037596 A1*  2/2010  Toshioka ........... B01D 53/9418
                                                    60/286
(Continued)

FOREIGN PATENT DOCUMENTS

JP         11343834 A  * 12/1999
JP       2002188429 A  *  7/2002
(Continued)

*Primary Examiner* — Patrick Maines
(74) *Attorney, Agent, or Firm* — Finnegan, Henderson, Farabow, Garrett & Dunner, LLP (57) ABSTRACT

The exhaust gas purification apparatus for an internal combustion engine that includes an oxidation catalyst and a selective catalytic reduction catalyst provided for an exhaust gas passage and has the improved entire NOx purification rate. A control unit, which controls a fuel supply amount to the oxidation catalyst, executes first control of controlling the fuel supply amount by the fuel supply unit so that NOx is reduced by the oxidation catalyst when the selective catalytic reduction catalyst is in an inactive state and the temperature of the oxidation catalyst belongs to a predetermined temperature range equal to or higher than the active temperature of the oxidation catalyst, and second control of controlling the fuel supply amount by the fuel supply unit so that the temperature of the exhaust gas flowing into the selective catalytic reduction catalyst is raised by oxidation of the fuel in the oxidation catalyst irrespective of a NOx purification rate of the selective catalytic reduction catalyst when the selective catalytic reduction catalyst is in the inactive state and the temperature of the oxidation catalyst exceeds the predetermined temperature range.

5 Claims, 5 Drawing Sheets (51) Int. Cl.
  *F01N 3/20* (2006.01)
  *F01N 9/00* (2006.01)
  *F01N 13/00* (2010.01)
  *F01N 11/00* (2006.01)

(52) U.S. Cl.
  CPC ......... *F01N 3/2033* (2013.01); *F01N 3/2066* (2013.01); *F01N 9/00* (2013.01); *F01N 11/002* (2013.01); *F01N 13/009* (2014.06); F01N 2550/02 (2013.01); F01N 2610/02 (2013.01); F01N 2610/03 (2013.01); F01N 2900/1602 (2013.01); F01N 2900/1626 (2013.01); Y02T 10/24 (2013.01); Y02T 10/26 (2013.01); Y02T 10/47 (2013.01)

(58) Field of Classification Search
  USPC .................................................... 60/295, 299
  See application file for complete search history.

(56) References Cited

U.S. PATENT DOCUMENTS

2010/0122527 A1* 5/2010 Fukuda ................ B01D 46/006
  60/286
2015/0322834 A1* 11/2015 Haba ..................... F01N 3/0814
  60/285

FOREIGN PATENT DOCUMENTS

| | | | |
|---|---|---|---|
| JP | 2003-343241 | | 12/2003 |
| JP | 3482874 | | 1/2004 |
| JP | 2004-60515 | | 2/2004 |
| JP | 2006274986 | A * | 10/2006 |
| JP | 2009-41454 | | 2/2009 |
| JP | 2009041454 | A * | 2/2009 |
| JP | 2012-007557 | A | 1/2012 |
| JP | 2012097729 | A * | 5/2012 |

* cited by examiner

EXHAUST GAS PURIFICATION APPARATUS FOR INTERNAL COMBUSTION ENGINE

CROSS-REFERENCE TO RELATED APPLICATIONS

This application is a national phase application of International Application No. PCT/JP2014/057511, filed Mar. 19, 2014, and claims the priority of Japanese Application No. 2013-060714, filed Mar. 22, 2013, the content of both of which is incorporated herein by reference.

TECHNICAL FIELD

The present invention relates to an exhaust gas purification apparatus for an internal combustion engine having an exhaust gas passage in which an oxidation catalyst and a selective catalytic reduction catalyst are provided.

BACKGROUND ART

Conventionally, an exhaust gas purification apparatus is known, the apparatus including an oxidation catalyst having an oxidation ability and a selective catalytic reduction catalyst (SCR catalyst) selectively reduces nitrogen oxide (NOx) contained in the exhaust gas, the oxidation catalyst being provided in an exhaust gas passage of an internal combustion engine and the selective catalytic reduction catalyst (SCR catalyst) being provided in the exhaust gas passage on the upstream side of the oxidation catalyst. The oxidation catalyst can purify carbon monoxide and unburned fuel discharged from the internal combustion engine, and the oxidation catalyst can oxidize fuel supplied from a supply device to raise the exhaust gas temperature. Note that the oxidation catalyst can selectively reduce NOx contained in the exhaust gas to some extent by using fuel contained in the exhaust gas as a reducing agent. Accordingly, a technique is known, in which fuel is supplied in order to perform the NOx purification with the oxidation catalyst when the temperature of the exhaust gas flowing through the exhaust gas passage is in a first temperature region, while an aqueous urea solution (urea-water solution) is supplied in order to perform the NOx purification with the SCR catalyst when the temperature of the exhaust gas is in a second temperature region that is higher than the first temperature region (see, for example, Patent Literature 1).

PRIOR ART LITERATURES

Patent Literatures

Patent Literature 1: Japanese Patent Application Laid-Open No. 2009-41454
Patent Literature 2: Japanese Patent Application Laid-Open No. 2004-60515
Patent Literature 3: Japanese Patent No. 3482874
Patent Literature 4: Japanese Patent Application Laid-Open No. 2003-343241

SUMMARY OF THE INVENTION

Problems to be Solved by the Invention

By the way, the NOx purification abilities of the oxidation catalyst and the SCR catalyst actually depend on the catalyst temperatures (bed temperatures). The change of the exhaust gas temperature is not always coincident with the bed temperature change of the catalyst. Therefore, in the case of the technique described in Patent Literature 1 in which the supply of the fuel to the oxidation catalyst and the supply of the aqueous urea solution to the SCR catalyst are selectively used on the basis of the exhaust gas temperature, it is difficult to appropriately perform the supply of the reducing agent in accordance with the bed temperature of each of the catalysts. As a result, it is feared that the NOx purification ability is not effectively exhibited in each of the catalysts.

The present invention has been made taking the foregoing circumstances into consideration, an object of which is to raise the NOx purification rate of an exhaust gas purification apparatus as a whole, in relation to the exhaust gas purification apparatus for an internal combustion engine having an exhaust gas passage in which an oxidation catalyst and an SCR catalyst are provided.

Means for Solving the Problems

In order to achieve the object as described above, according to the present invention, there is provided an exhaust gas purification apparatus for an internal combustion engine, comprising:

an oxidation catalyst that is provided in an exhaust gas passage of the internal combustion engine and has an oxidation ability, the oxidation catalyst reducing NOx contained in an exhaust gas by using fuel supplied by the aid of the exhaust gas as a reducing agent when a catalyst temperature belongs to a predetermined temperature range equal to or higher than an active temperature thereof;

a fuel supply unit that supplies the fuel to the oxidation catalyst by the aid of the exhaust gas flowing into the oxidation catalyst;

a selective catalytic reduction catalyst that is provided in the exhaust gas passage on a downstream side of the oxidation catalyst and reduces NOx contained in the exhaust gas by using ammonia as a reducing agent;

a reducing agent supply unit that supplies ammonia or a precursor of ammonia to the selective catalytic reduction catalyst by the aid of the exhaust gas flowing into the selective catalytic reduction catalyst; and a control unit that controls a fuel supply amount by the fuel supply unit, wherein the control unit executes:

first control of controlling the fuel supply amount by the fuel supply unit so that NOx is reduced by the oxidation catalyst when the selective catalytic reduction catalyst is in an inactive state in cases where the temperature of the oxidation catalyst belongs to the predetermined temperature range; and second control of controlling the fuel supply amount by the fuel supply unit so that a temperature of the exhaust gas flowing into the selective catalytic reduction catalyst is raised by oxidation of the fuel in the oxidation catalyst irrespective of a NOx purification rate of the selective catalytic reduction catalyst when the selective catalytic reduction catalyst is in the inactive state in cases where the temperature of the oxidation catalyst exceeds the predetermined temperature range.

When the catalyst temperature is equal to or higher than the predetermined active temperature, the oxidation catalyst can exhibit the sufficient oxidation ability to oxidize the fuel and carbon monoxide contained in the exhaust gas. Note that when the catalyst temperature belongs to the predetermined temperature range of equal to or higher than the active temperature, the oxidation catalyst can further reduce NOx contained in the exhaust gas to some extent by using, as the reducing agent, the fuel supplied by the aid of the exhaust gas.

On the other hand, the selective catalytic reduction catalyst (SCR catalyst) reduces NOx contained in the exhaust gas by using ammonia as the reducing agent. In general, in the exhaust gas purification apparatus for the internal combustion engine, the purification of NOx, which is based on the reduction, is principally performed by the SCR catalyst. When the catalyst temperature is equal to or higher than a predetermined threshold temperature on the high temperature side, the SCR catalyst is in the active state in which the NOx purification rate is high. On the other hand, when the catalyst temperature is equal to or lower than a predetermined threshold temperature on the low temperature side, the SCR catalyst is in the inactive state in which the NOx purification rate is low.

In view of the above, the control unit of the present invention executes the first control of controlling the fuel supply amount by the fuel supply unit so that NOx is reduced by the oxidation catalyst when the selective catalytic reduction catalyst is in the inactive state in cases where the temperature of the oxidation catalyst belongs to the predetermined temperature range of equal to or higher than the active temperature thereof. Accordingly, even if the NOx purification ability of the SCR catalyst is low, the reduction of NOx, which is performed by the oxidation catalyst, is facilitated by supplying the fuel to the oxidation catalyst in the state in which the NOx purification ability is exhibited. As a result, it is possible to secure the NOx purification ability of the exhaust gas purification apparatus as far as possible.

Further, the control unit of the present invention executes the second control of controlling the fuel supply amount by the fuel supply unit so that a temperature of the exhaust gas flowing into the selective catalytic reduction catalyst is raised by oxidation of the fuel in the oxidation catalyst irrespective of a NOx purification rate of the selective catalytic reduction catalyst when the selective catalytic reduction catalyst is in the inactive state in cases where the temperature of the oxidation catalyst exceeds the predetermined temperature range. In this situation, the catalyst temperature of the oxidation catalyst is high, and hence it is impossible to count on the reduction of NOx caused by the oxidation catalyst. However, the oxidation ability to oxidize the fuel by the oxidation catalyst is sufficiently high. Accordingly, the fuel is supplied so that the temperature of the exhaust gas allowed to flow into the selective catalytic reduction catalyst is raised by the oxidation of the fuel caused by the oxidation catalyst irrespective of the NOx purification rate brought about by the SCR catalyst. Thus, it is possible to perform the supply of the fuel specialized to the increase in the temperature of the SCR catalyst. As a result, the SCR catalyst can be transited to the active state more promptly. Therefore, the NOx purification rate of the SCR catalyst having the high NOx purification ability can be raised at an early stage, and it is possible to secure the NOx purification ability of the exhaust gas purification apparatus as far as possible.

As described above, according to the present invention, the fuel supply amount by the fuel supply unit is controlled so that the NOx purification rate of the catalyst with which the NOx purification ability is more exhibited is raised in accordance with the temperature of the oxidation catalyst when the SCR catalyst is in the inactive state in cases where the temperature of the oxidation catalyst is equal to or higher than the active temperature thereof. Therefore, it is possible to raise the NOx purification rate of the entire exhaust gas purification apparatus.

Note that the SCR catalyst is in the transient state between the active state and the inactive state when the catalyst temperature thereof is within a temperature range which is determined by the predetermined threshold temperature on the high temperature side and the predetermined threshold temperature on the low temperature side described above. When the SCR catalyst is in the transient state, a correlation is given between the catalyst temperature and the NOx purification rate of the SCR catalyst. When the catalyst temperature is raised, the NOx purification rate of the SCR catalyst is raised. However, the NOx purification rate, which is provided in this situation, is equal to or lower than the NOx purification rate which is provided in the active state. Further, when the SCR catalyst is in the transient state, a correlation is also given between the NOx purification rate and the ratio ($NO_2$ ratio) between nitrogen monoxide (NO) and nitrogen dioxide ($NO_2$) contained in the exhaust gas allowed to flow into the SCR catalyst. Specifically, when the SCR catalyst is in the transient state, if the $NO_2$ ratio in the exhaust gas in the SCR catalyst approaches 50% more closely, then the NOx purification rate is more raised by facilitating the specified reduction reaction of NOx. It is now assumed that the NOx purification rate of the SCR catalyst, which is provided when the $NO_2$ ratio of the exhaust gas in the SCR catalyst is a specified ratio (for example, 50%), is designated as "predetermined purification rate". On this assumption, the $NO_2$ ratio in the SCR catalyst may be changed from the $NO_2$ ratio of the exhaust gas allowed to flow into the SCR catalyst. Therefore, the $NO_2$ ratio of the exhaust gas flowing into the SCR catalyst, which makes it possible to allow the NOx purification rate of the SCR catalyst to be the predetermined purification rate, can be determined as the predetermined ratio.

In view of the above, the control unit of the present invention may execute third control of controlling the fuel supply amount by the fuel supply unit so that the oxidation of the fuel by the oxidation catalyst causes the temperature of the exhaust gas flowing into the selective catalytic reduction catalyst to rise, while keeping a ratio between nitrogen monoxide and nitrogen dioxide contained in the exhaust gas flowing into the selective catalytic reduction catalyst a predetermined ratio at which the NOx purification rate brought about by the selective catalytic reduction catalyst in the transient state to be a predetermined purification rate when the selective catalytic reduction catalyst is in a transient state between an active state and the inactive state in cases where the temperature of the oxidation catalyst is equal to or higher than the active temperature thereof. By this, the temperature of the SCR catalyst can be raised to promptly cause transition to the active state, while raising the NOx purification rate of the SCR catalyst in the transient state as far as possible. As a result, the NOx purification rate of the SCR catalyst can be raised at an early stage, and it is possible to secure the NOx purification ability of the exhaust gas purification apparatus as far as possible.

Further, the control unit of the present invention may execute the first control in place of the third control when the selective catalytic reduction catalyst is in the transient state and the NOx purification rate of the oxidation catalyst upon executing the first control is predicted to be higher than the NOx purification rate of the selective catalytic reduction catalyst upon executing the third control in cases where the temperature of the oxidation catalyst is equal to or higher than the active temperature thereof. With this, it is possible to selectively execute the control in which the NOx purification rate of the oxidation catalyst is predicted to be more raised. Therefore, it is possible to reliably raise the NOx purification rate of the entire exhaust gas purification apparatus.

Further, the control unit of the present invention may executes the third control when the selective catalytic reduction catalyst is in the transient state in cases where the temperature of the selective catalytic reduction catalyst is higher than the active temperature thereof and also executes the third control when it is predicted that the temperature of the selective catalytic reduction catalyst is lowered on account of the temperature of the oxidation catalyst, causing the selective catalytic reduction catalyst to enter to the transient state on account of the temperature of the oxidation catalyst, in cases where the temperature of the selective catalytic reduction catalyst is higher than the active temperature thereof. For example, when the temperature of the oxidation catalyst is sufficiently lower than the temperature of the SCR catalyst, it is feared that the exhaust gas having a low temperature, which flows out from the oxidation catalyst, may flow into the SCR catalyst arranged on the downstream side to lower the temperature of the SCR catalyst. Accordingly, there is such a possibility that the NOx purification rate of the SCR catalyst may be lowered on account of the temperature of the SCR catalyst lowered to a temperature at which the transient state is given. According to the present invention, the third control is previously executed in such a situation. Therefore, the decrease in the NOx purification rate of the SCR catalyst is suppressed beforehand after the transition to the transient state.

Further, the control unit of the present invention may prohibits the third control when the selective catalytic reduction catalyst is in the transient state and it is predicted that the temperature of the selective catalytic reduction catalyst is raised on account of the temperature of the oxidation catalyst, causing the selective catalytic reduction catalyst to enter to the active state, in cases where the temperature of the oxidation catalyst is equal to or higher than the active temperature thereof. For example, when the temperature of the oxidation catalyst is sufficiently higher than the temperature of the SCR catalyst, the temperature of the SCR catalyst is predicted to be raised on account of the inflow into the SCR catalyst, of the exhaust gas having a high temperature allowed to flow out from the oxidation catalyst. In other words, the temperature of the SCR catalyst is predicted to be raised to cause transition to the active state even when the temperature raising of the SCR catalyst is not executed. According to the present invention, the third control is prohibited in the situation as described above. Therefore, it is possible to reduce the fuel supply amount.

Advantageous Effect of the Invention

According to the present invention, the fuel supply amount to be supplied by the fuel supply unit is controlled so that the NOx purification rate of the catalyst with which the NOx purification ability is more exhibited is raised in accordance with the temperatures of the oxidation catalyst and the SCR catalyst in the exhaust gas purification apparatus for the internal combustion engine in which the oxidation catalyst and the SCR catalyst are arranged for the exhaust gas passage. Therefore, it is possible to raise the NOx purification rate of the entire exhaust gas purification apparatus.

EMBODIMENTS FOR CARRYING OUT THE INVENTION

An explanation will be made on the basis of the drawings about specified embodiments of the present invention. The dimension or size, the material, the shape, the relative arrangement of each of constitutive parts or components, and so on described in the embodiments of the present invention are not intended to limit the technical scope of the invention only thereto unless specifically noted.

[First Embodiment]

Figure 1:
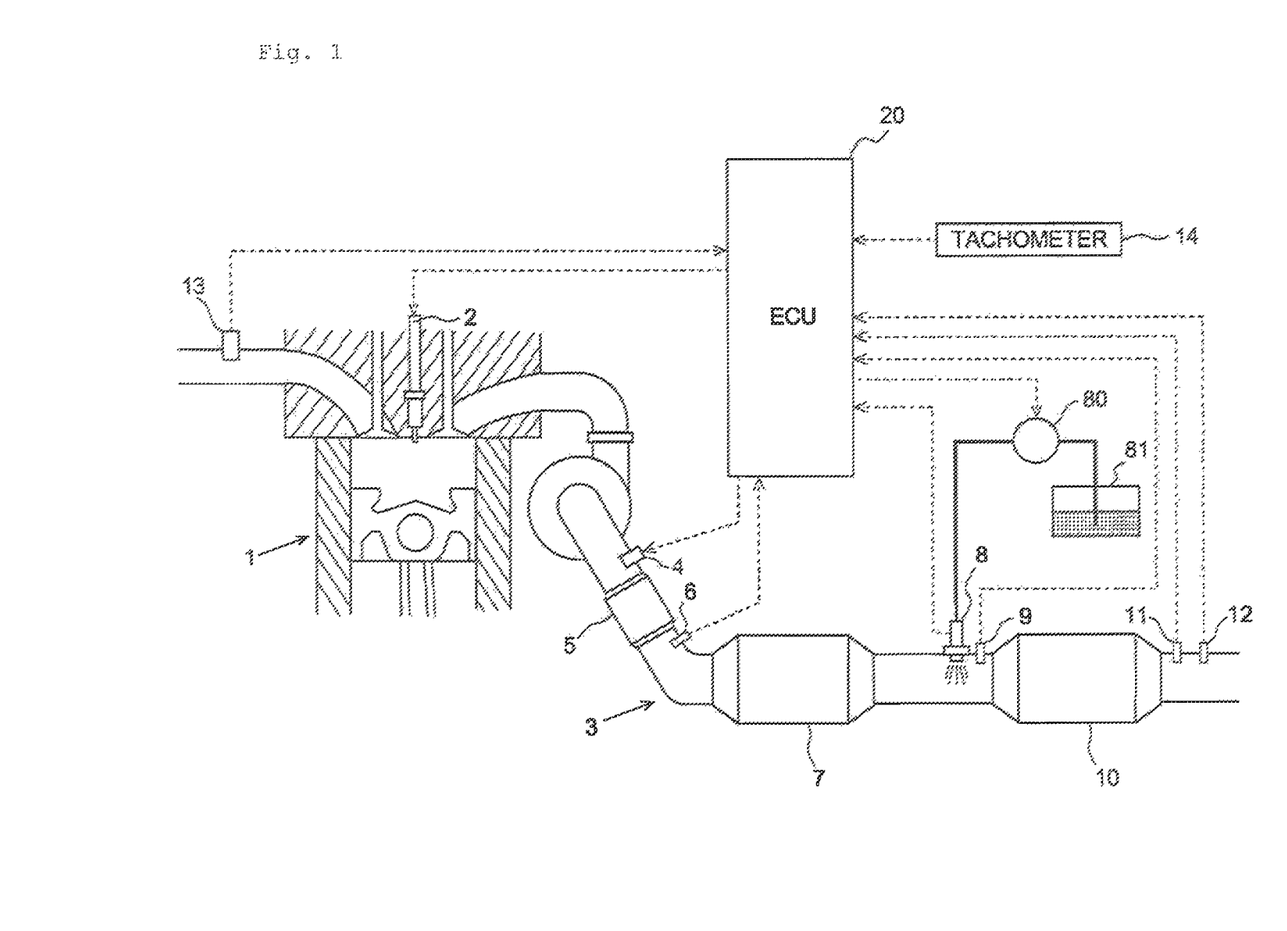
FIG. 1 shows a schematic arrangement of an internal combustion engine and an exhaust gas purification apparatus according to a first embodiment of the present invention.

At first, an explanation will be made about the configuration or arrangement of an exhaust gas purification apparatus for an internal combustion engine according to a first embodiment of the present invention. FIG. 1 shows a schematic arrangement of the internal combustion engine and an intake/exhaust system thereof to which the present invention is applied. The internal combustion engine 1 shown in FIG. 1 is a compression ignition type internal combustion engine (diesel engine) having a plurality of cylinders for an automobile. Note that the internal combustion engine, to which the present invention is applicable, is not limited to the compression ignition type internal combustion engine, but may be a spark ignition type internal combustion engine (gasoline engine).

The internal combustion engine 1 is provided with a fuel injection valve 2 for injecting the fuel into the cylinder. Further, an exhaust gas passage 3, which is provided in order to allow the exhaust gas discharged from the cylinder of the internal combustion engine 1 to flow therethrough, is connected to the internal combustion engine 1. The exhaust gas passage 3 is arranged with a fuel addition valve 4, an oxidation catalyst 5, a first exhaust gas temperature sensor 6, DPF 7, an aqueous urea solution (urea-water solution) addition valve 8, a first NOx sensor 9, a selective catalytic reduction catalyst 10 (hereinafter referred to as "SCR catalyst 10"), a second NOx sensor 11, and a second exhaust gas temperature sensor 12 as referred to in this order from the upstream side. The fuel addition valve 4, which serves as the fuel supply unit, injects the fuel into the exhaust gas flowing in the exhaust gas passage 3 to supply the fuel to the oxidation catalyst 5. Note that the fuel may be supplied to the oxidation catalyst 5 such that the after injection or the post injection, in which the fuel is injected after the occurrence of the combustion in the cylinder, is performed by means of the fuel injection valve 2. In this case, the fuel injection valve 2 corresponds to the fuel supply unit in this embodiment.

The oxidation catalyst 5 oxidizes, for example, carbon monoxide (CO) and unburned fuel discharged from the internal combustion engine 1 to suppress them from being discharged to the atmospheric air. Further, the oxidation catalyst 5 oxidizes the fuel supplied by the fuel injection valve 2 and/or the fuel addition valve 4 to raise the exhaust gas temperature. The exhaust gas temperature is raised, for example, upon the execution of the regeneration process for DPF 7. Note that the oxidation catalyst 5 can also purify NOx discharged from the internal combustion engine 1 by means of the selective reduction by using the fuel as the reducing agent, when the catalyst temperature belongs to a predetermined temperature range of not less than the active temperature thereof (details will be described later on).

The SCR catalyst 10 purifies NOx by selectively reducing NOx contained in the exhaust gas into nitrogen ($N_2$) by using ammonia. In the internal combustion engine 1, the purification of NOx is principally performed by the SCR catalyst 10. In other words, the NOx purification ability of the SCR catalyst 10 in the active state is higher than the purification ability exhibited by the oxidation catalyst 5. As for the SCR catalyst 10, a catalyst carrier, which has the function to adsorb inflowing ammonia, is accommodated in a cylindrical casing. The catalyst carrier is provided such that a base material having a honeycomb-shaped cross section, which is composed of cordierite, Fe—Cr—Al based heat resistant steel or the like, is coated with an alumina or zeolite based active component (carrier). Note that in this embodiment, DPF 7 and the SCR catalyst 10 are provided separately. However, it is also allowable to use an SCR catalyst in which the both are integrated into one unit.

The aqueous urea solution addition valve 8, which adds the aqueous urea solution dissolved with urea (($NH_2)_2CO$) as a precursor of ammonia to the exhaust gas allowed to flow through the exhaust gas passage 3, is disposed in the exhaust gas passage 3 on the upstream side of the SCR catalyst 10. The aqueous urea solution addition valve 8 is connected to an aqueous urea solution tank 81 via a pump 80 and injects the aqueous urea solution, which is fed under pressure by the pump 80 from the aqueous urea solution tank 81, into the exhaust gas passage 3. Ammonia is produced from the injected aqueous urea solution in accordance with the hydrolysis reaction caused by the heat of the exhaust gas. Ammonia, which is produced as described above, is consumed as the reducing agent in the SCP catalyst 10. Note that aqueous ammonia (ammonia water) with ammonia dissolved may be added in place of the aqueous urea solution.

ECU 20, which is an electronic control unit for controlling the internal combustion engine 1, is provided in combination with the internal combustion engine 1 constructed as described above. ECU 20 is electrically connected to various devices such as the fuel injection valve 2, the fuel addition valve 4, the aqueous urea solution addition valve 8 and the pump 80, and ECU 20 electrically controls them. Further, ECU 20 is electrically connected to various sensors such as the first exhaust gas temperature sensor 6, the first NOx sensor 9, the second NOx sensor 11, the second exhaust gas temperature sensor 12, an air flow meter 13 and a tachometer 14.

The first exhaust gas temperature sensor 6 is arranged in the exhaust gas passage 3 on the downstream side of the oxidation catalyst 5, and the first exhaust gas temperature sensor 6 outputs the electric signal correlated with the temperature of the exhaust gas allowed to flow out from the oxidation catalyst 5. ECU 20 estimates the catalyst temperature (bed temperature) of the oxidation catalyst 5 by using the electric signal outputted from the first exhaust gas temperature sensor 6. Further, the second exhaust gas temperature sensor 12 is arranged in the exhaust gas passage 3 on the downstream side of the SCR catalyst 10, and the second exhaust gas temperature sensor 12 outputs the electric signal correlated with the temperature of the exhaust gas allowed to flow out from the SCR catalyst 10. ECU 20 estimates the bed temperature of the SCR catalyst 10 by using the electric signal outputted from the second exhaust gas temperature sensor 12.

Further, the first NOx sensor 9 is arranged in the exhaust gas passage 3 on the upstream side from the SCR catalyst 10, and the first NOx sensor 9 outputs the electric signal correlated with the NOx concentration in the exhaust gas allowed to flow into the SCR catalyst 10. Further, the second NOx sensor 11 is arranged in the exhaust gas passage 3 on the downstream side of the SCR catalyst 10, and the second NOx sensor 11 outputs the electric signal correlated with the NOx concentration in the exhaust gas allowed to flow out from the SCR catalyst 10. ECU 20 estimates the NOx purification rate of the SCR catalyst 10 by using the electric signals outputted from the two NOx sensors.

Further, the air flow meter 13 is arranged in the intake gas passage of the internal combustion engine 1, and the air flow meter 13 outputs the electric signal correlated with the intake gas amount intaken into the internal combustion engine 1. ECU 20 calculates the oxygen amount intaken into the cylinder of the internal combustion engine 1 by using the electric signal outputted from the air flow meter 13. Further, ECU 20 estimates the NOx amount discharged from the internal combustion engine 1, i.e., the NOx amount allowed to flow into the oxidation catalyst 5 by using the calculated oxygen amount, the fuel amount injected by the fuel injection valve 2, and the engine rotation speed of the internal combustion engine 1 detected by the tachometer 14.

Next, an explanation will be made about the catalytic function of the oxidation catalyst 5 according to this embodiment. In the oxidation catalyst 5, when the bed temperature becomes equal to or higher than a predetermined temperature Td1 (for example, 150° C.) as the active temperature, the catalyst is activated, and the fuel (hydrocarbon HC) is oxidized in accordance with the oxidation reaction 1 represented by the following reaction formula 1.

$$2HC + 5/2 O_2 \rightarrow 2CO_2 + H_2O \tag{1}$$

This oxidation reaction is an exothermic reaction. Therefore, when the temperature raising of the SCR catalyst 10 and/or the regeneration process for DPF 7 is/are executed, the fuel supply to the oxidation catalyst 5 is executed in order to raise the temperature of the exhaust gas allowed to flow out from the oxidation catalyst 5.

On the other hand, the oxidation catalyst 5 can selectively reduce NOx to some extent by using the fuel as the reducing agent, although the oxidation catalyst 5 is inferior to the SCR catalyst 10. In particular, the oxidation catalyst 5 can selectively reduce $NO_2$ included in NOx in accordance with the reduction reaction 2 represented by the following reaction formula 2 by using, as the reducing agent, hydrocarbon (for example, propylene ($C_3H_6$)) contained in the fuel.

$$NO_2 + 2/9 C_3H_6 \rightarrow 1/2 N_2 + 2/3 CO_2 + 2/3 H_2O \tag{2}$$

Note that the ratio of NO is the highest among NOx contained in the exhaust gas discharged from the internal combustion engine 1. Therefore, in order to effectively purify NOx by means of the oxidation catalyst 5, it is necessary that the oxidation reaction 3 of NO represented by the following reaction formula 3 is facilitated in relation to the oxidation catalyst 5 to produce $NO_2$ subjected to the reduction reaction 2 as the premise thereof.

$$2NO+O_2 \rightarrow 2NO_2 \quad (3)$$

The fuel, which is supplied to the oxidation catalyst 5, is subjected to the oxidation reaction 1 and the reduction reaction 2. However, in the oxidation catalyst 5, the oxidation reaction 1 occurs easier, and therefore the supplied fuel is preferentially consumed by the oxidation reaction 1. Accordingly, there is such a possibility that the oxidation reaction 1 may be excessively facilitated depending on the supply amount of the fuel. The oxidation ability of the oxidation catalyst 5 is constant if the bed temperature is constant. Further, there is a limit to oxygen contained in the exhaust gas. Therefore, when oxygen is consumed on account of the excessively facilitated oxidation reaction 1, there is such a possibility that the oxidation reaction 3 may be suppressed. If the oxidation reaction 3 is suppressed, then the amount of $NO_2$ produced by the oxidation reaction 3 is decreased, and hence the reduction reaction 2 is suppressed. As a result, it is feared that the NOx purification ability of the oxidation catalyst 5 may be lowered. Therefore, in order to effectively purify NOx by means of the oxidation catalyst 5, it is necessary to supply an appropriate amount of the fuel to the oxidation catalyst 5.

Figure 2:
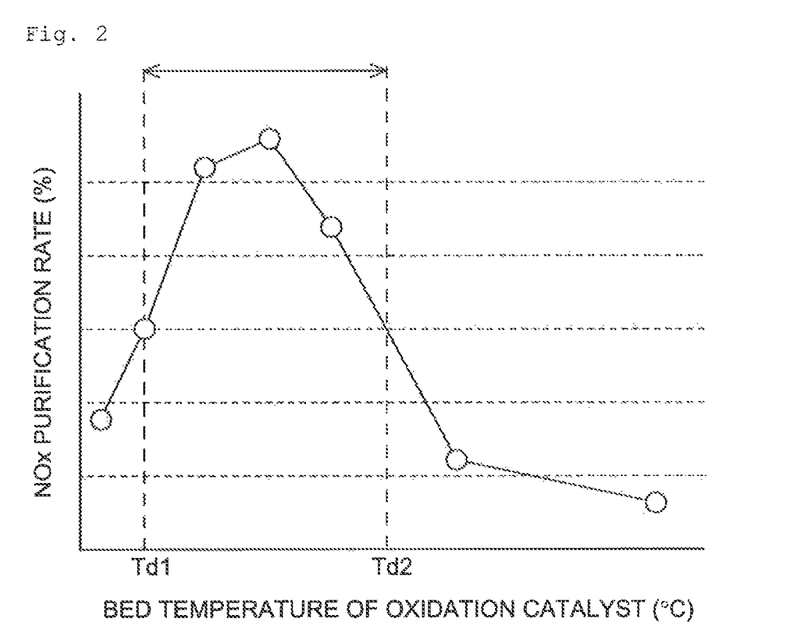
FIG. 2 shows a graph illustrating a relationship between the bed temperature and the NOx purification rate of an oxidation catalyst according to the first embodiment of the present invention.

When the appropriate amount of the fuel is supplied to the oxidation catalyst 5, the oxidation catalyst 5 exhibits the characteristic as shown in FIG. 2. Note that FIG. 2 shows a relationship between the bed temperature and the NOx purification rate of the oxidation catalyst 5 when the appropriate amount of the fuel is supplied to the oxidation catalyst 5. As shown in FIG. 2, when the bed temperature of the oxidation catalyst 5 is lower than a temperature Td1, then the oxidation ability of the oxidation catalyst 5 is low, and hence the NOx purification rate is low. On the other hand, when the bed temperature is higher than a temperature Td2 (for example, about 280° C.), then the oxidation ability of the oxidation catalyst 5 is sufficiently high, but the oxidation reaction 1, in which the fuel is oxidized, is dominantly caused. Therefore, the reduction reaction of $NO_2$ is suppressed, and the NOx purification rate is lowered. In other words, the oxidation catalyst 5 can effectively reduce NOx contained in the exhaust gas when the catalyst temperature thereof is within a temperature range from the temperature Td1 to the temperature Td2, i.e., when the catalyst temperature belongs to a predetermined temperature range equal to or higher than the active temperature Td1 thereof. Therefore, in order to effectively exhibit the NOx purification ability of the oxidation catalyst 5, it is appropriate to perform the control for supplying the appropriate amount of the fuel in cases where the bed temperature of the oxidation catalyst 5 is within the temperature range.

Figure 3:
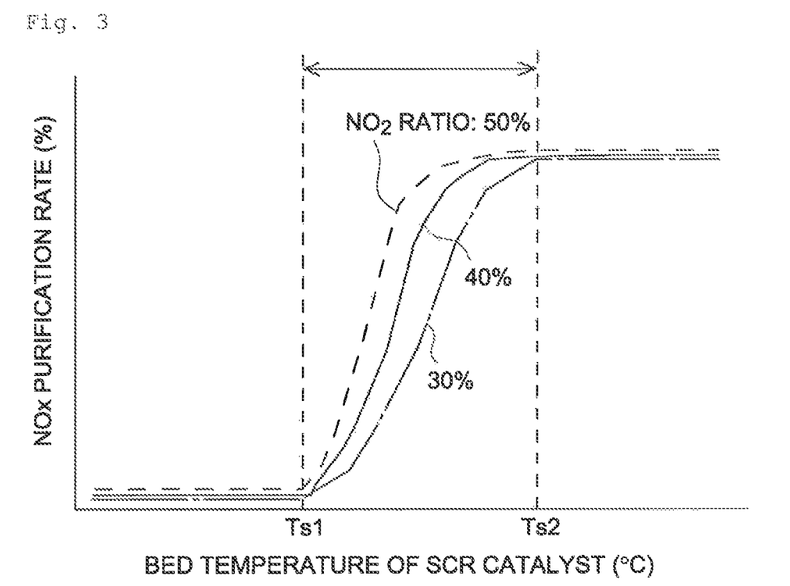
FIG. 3 shows a graph illustrating a relationship between the bed temperature and the NOx purification rate of an SCR catalyst according to the first embodiment of the present invention.

Next, an explanation will be made with reference to FIG. 3 about the catalytic function of the SCR catalyst 10 according to this embodiment. Note that FIG. 3 shows a relationship between the bed temperature and the NOx purification rate of the SCR catalyst 10. Further, in FIG. 3, the broken line indicates the NOx purification rate when the $NO_2$ ratio (ratio of the substance amount of $NO_2$ with respect to the total substance amount of NO and $NO_2$) in the exhaust gas is 50%, and the solid line and the alternate long and short dash line indicate the NOx purification rates when the $NO_2$ ratios are 40% and 30% respectively.

As shown in FIG. 3, when the bed temperature of the SCR catalyst 10 is equal to or lower than a temperature Ts1 (for example, about 150° C.), the SCR catalyst 10 is in the inactive state, and the NOx purification rate is low. On the other hand, when the bed temperature is equal to or higher than a temperature Ts2 (for example, about 200° C.), the SCR catalyst 10 is in the active state and the NOx purification rate is high. Note that the influence, which is exerted by the $NO_2$ ratio in the exhaust gas on the NOx purification rate of the SCR catalyst 10, is generally small in either state of the inactive state or the active state. Note that the temperature Ts2 corresponds to the active temperature of the SCR catalyst 10. Further, the SCR catalyst 10 is in the transient state between the active state and the inactive state when the bed temperature thereof is within a temperature range from the temperature Ts1 to the temperature Ts2. There is such a tendency that the NOx purification rate of the SCR catalyst 10 in the transient state is raised depending on the increase in the temperature, and the NOx purification rate is varied in accordance with the $NO_2$ ratio.

In particular, as shown in FIG. 3, the nearer to 50% the $NO_2$ ratio is, the higher the NOx purification rate of the SCR catalyst 10 in the transient state is. This is the result of the fact that reduction reaction 4 represented by the reaction formula (4), in which NO and $NO_2$ are reacted at a ratio of 1:1, dominantly occurs in the SCR catalyst 10 in the transient state.

$$NO+NO_2+2NH_3 \rightarrow 2N_2+3H_2O \quad (4)$$

Therefore, the nearer to 1:1 the ratio between NO and $NO_2$ in the SCR catalyst 10 is, i.e., the nearer to 50% the $NO_2$ ratio is, the more accelerated the reduction reaction 4 is, and hence the higher the NOx purification rate of the SCR catalyst 10 is. Accordingly, when the SCR catalyst 10 is in the transient state, the NOx purification rate of the SCR catalyst 10 can be raised to the predetermined purification rate in the case where the $NO_2$ ratio is 50%, by approximating the $NO_2$ ratio of the exhaust gas flowing into the SCR catalyst 10 to the predetermined ratio at which the reduction reaction 4 is accelerated. Therefore, when the amount of the fuel supplied to the oxidation catalyst 5 is appropriately controlled to approximate the $NO_2$ ratio of the exhaust gas flowing out from the oxidation catalyst 5 (i.e., the exhaust gas flowing into the SCR catalyst 10) to the predetermined ratio, it is possible to raise the temperature of the SCR catalyst 10, while increasing the NOx purification rate of the exhaust gas flowing into the SCR catalyst 10 in the transient state to the predetermined purification rate.

Figure 4:
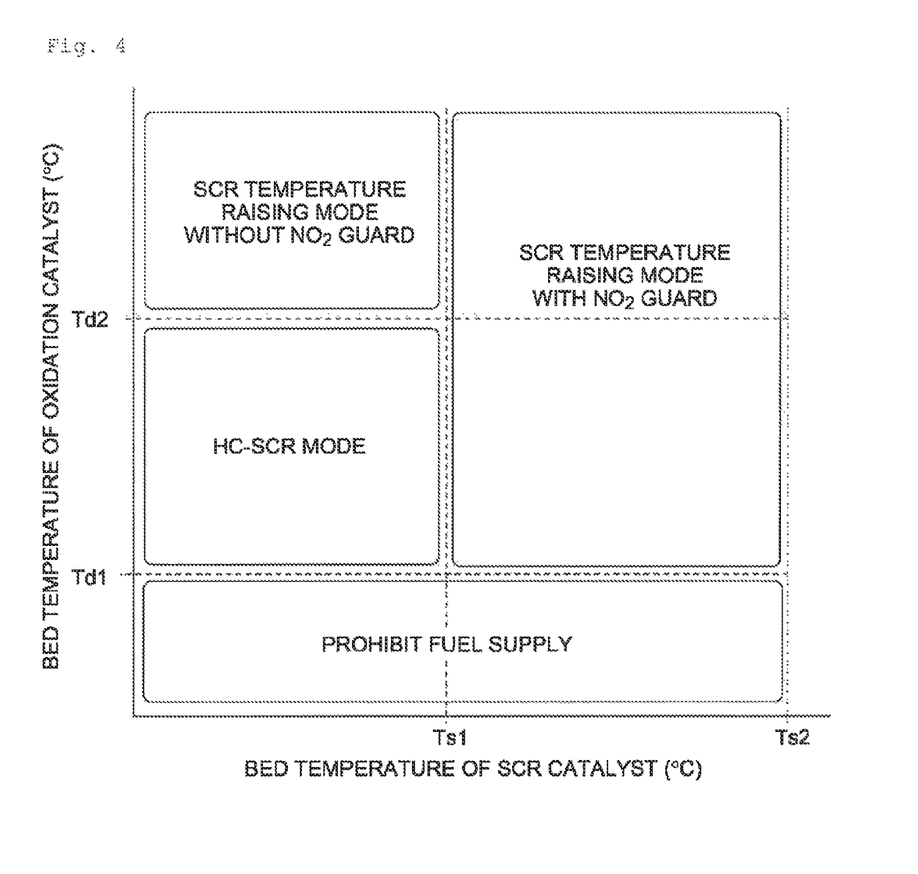
FIG. 4 illustrates control modes of the fuel supply according to the first embodiment of the present invention.

Next, an explanation will be made with reference to FIG. 4 about the fuel supply control executed by ECU 20 in order to increase the NOx purification rate of the exhaust gas purification apparatus according to this embodiment. Note that the fuel supply control is the control of the amount of the fuel supplied from the fuel injection valve 2 and the fuel addition valve 4 as executed by ECU 20 that serves as the control unit in this embodiment. Further, FIG. 4 illustrates control modes of the fuel supply control executed by ECU 20 in cases where the bed temperature of the SCR catalyst 10 is equal to or lower than the temperature Ts2 defined as the active temperature thereof and the bed temperature of the oxidation catalyst 5 is equal to or higher than the temperature Td1 defined as the active temperature thereof. Note that as shown in FIG. 4, when the bed temperature of the oxidation catalyst 5 is less than the temperature Td1, it is feared that the supplied fuel may flow out without being sufficiently oxidized, and therefore the fuel supply is prohibited by ECU 20.

In cases where the bed temperature of the oxidation catalyst 5 belongs to the temperature range from the temperature Td1 to the temperature Td2, when the bed temperature of the SCR catalyst 10 is equal to or lower than the temperature Ts1, the SCR catalyst 10 is in the inactive state, while the oxidation catalyst 5 is in the state capable of exhibiting the NOx purification ability. In this situation, as shown in FIG. 4, "HC-SCR mode" is executed by ECU 20. This control mode is such a mode that the fuel supply amount is controlled so that the reduction of NOx is performed by the oxidation catalyst 5 as described above. This enables the reduction of NOx to be facilitated by the oxidation catalyst 5 in a state where the NOx purification ability is more exhibited, and therefore the NOx purification rate of the exhaust gas purification apparatus increases. In this context, the amount of the fuel, which is supplied during the execution of this control mode, is the amount that is determined on the basis of the bed temperature of the oxidation catalyst 5, etc. The amount of the fuel may be previously determined, for example, by means of any experiment. Note that, this control mode corresponds to the first control according to the present invention.

In the case of the bed temperature of the oxidation catalyst 5 being higher than the temperature Td2, when the bed temperature of the SCR catalyst 10 is equal to or lower than the temperature Ts1, the oxidation catalyst 5 is in such a state that NOx contained in the exhaust gas cannot be effectively purified, and the SCR catalyst 1 is in the inactive state as well. However, in this situation, the oxidation catalyst 5 has the high oxidation ability, because the bed temperature is high. Therefore, in this situation, as shown in FIG. 4, "SCR temperature raising mode without $NO_2$ guard" is performed by ECU 20. This control mode is such a mode that the fuel supply amount is controlled so that the temperature of the exhaust gas flowing into the SCR catalyst 10 is raised due to the oxidation of the fuel by the oxidation catalyst 5, irrelevant to the NOx purification rate of the SCR catalyst 10. By this, it is possible to perform the supply of the fuel specialized to the increase in the temperature of the SCR catalyst 10. As a result, the temperature of the SCR catalyst 10 is raised at an earlier stage, and therefore, it is possible to effectively increase the NOx purification rate of the SCR catalyst 10 having the high NOx purification ability. Here, the amount of the fuel supplied during the execution of this control mode, is the amount that is determined on the basis of the air amount detected by the air flow meter 13, the bed temperature of the SCR catalyst 10, etc. The amount of the fuel may be previously determined, for example, by means of some experiment. Note that this control mode corresponds to the second control according to the present invention.

In the case of the bed temperature of the oxidation catalyst 5 being equal to or higher than the temperature Td1, when the bed temperature of the SCR catalyst 10 is within the range from the temperature Ts1 to the temperature Ts2, the SCR catalyst 10 is in the transient state, while the oxidation catalyst 5 is in a state capable of exhibiting the NOx purification ability. In this situation, as shown in FIG. 4, "SC temperature raising mode with $NO_2$ guard" is performed by ECU 20. In this control mode, the fuel supply amount is controlled so that the temperature of the exhaust gas flowing into the SCR catalyst 10 is raised by the oxidation of the fuel in the oxidation catalyst 5 while keeping the ratio between NO and $NO_2$ in the exhaust gas flowing into the SCR catalyst 10 to a predetermined ratio that allows the NOx purification rate of the SCR catalyst 10 in the transient state to be the predetermined purification rate. By this, it is possible to increase the NOx purification rate by raising the temperature of the SCR catalyst 10 while approximating the NOx purification rate of the SCR catalyst 10 in the transient state to the predetermined purification rate. In this procedure, the amount of the fuel supplied during the execution of this control mode, is the amount which is determined on the basis of the air amount detected by the air flow meter 13, the fuel injection amount injected by the fuel injection valve 2, etc. The amount of the fuel may be previously determined by means of some experiment, for example. Note that this control mode corresponds to the third control according to the present invention.

Figure 5:
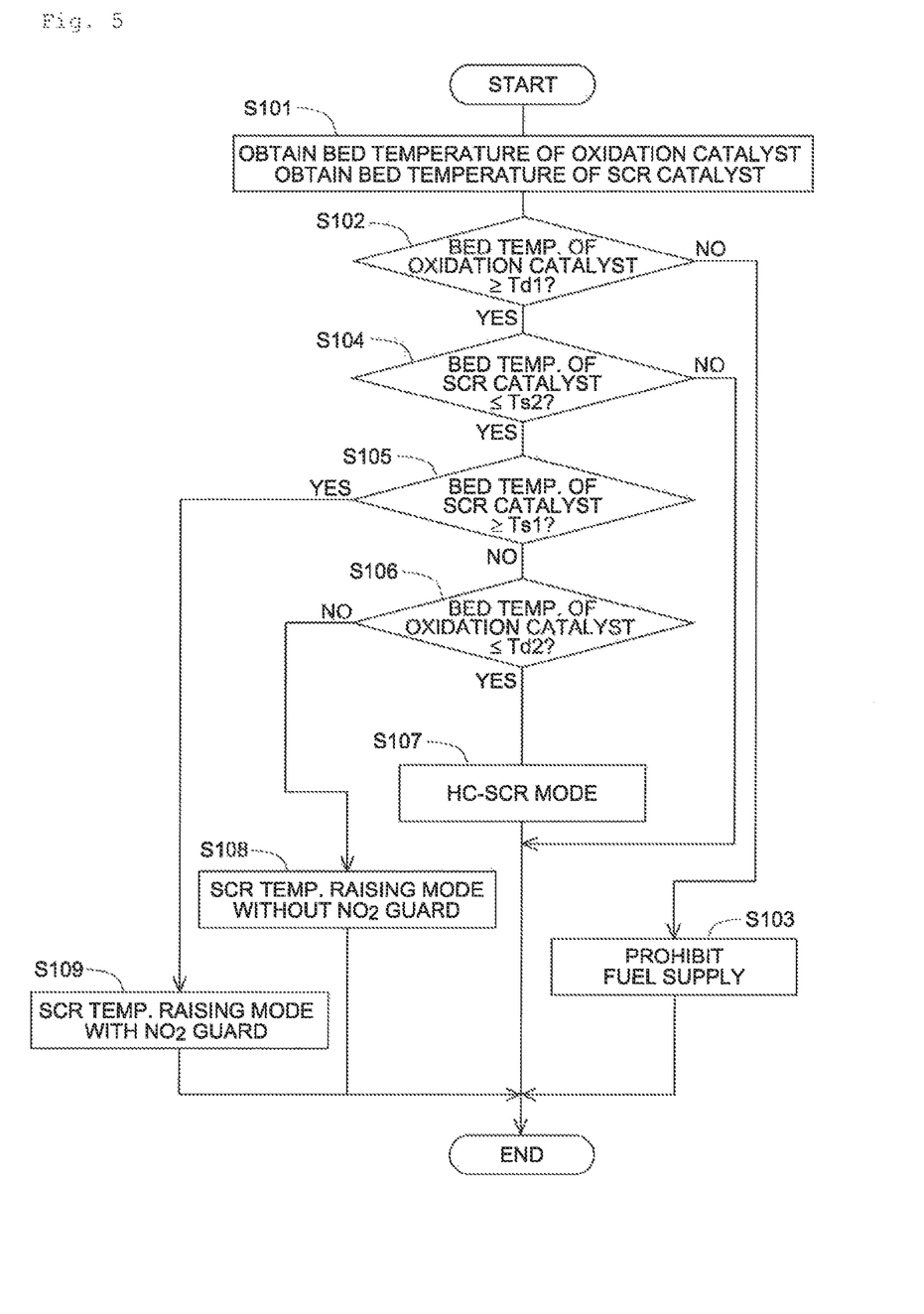
FIG. 5 shows a flow chart illustrating the fuel supply control according to the first embodiment of the present invention.

Next, an explanation will be made with reference to FIG. 5 about an execution procedure of the fuel supply control in this embodiment. FIG. 5 shows a flow chart illustrating a control flow executed by ECU 20. This control flow is periodically executed during the operation of the internal combustion engine 1.

When this control flow is started, ECU 20 obtains, in step S101, the bed temperature of the oxidation catalyst 5 and the bed temperature of the SCR catalyst 10 upon the execution of the control flow this time. As described above, the bed temperature of the oxidation catalyst 5 and the bed temperature of the SCR catalyst 10 are estimated from the exhaust gas temperatures detected by the first exhaust gas temperature sensor 6 and the second exhaust gas temperature sensor 12, respectively.

Subsequently, ECU 20 judges, in step S102, whether or not the bed temperature of the oxidation catalyst 5 is equal to or higher than the temperature Td1. When the negative judgment is made in this step, ECU 20 proceeds to step S103 to prohibit the fuel supply and then terminates this routine.

When the affirmative judgment is made in step S102, ECU 20 proceeds to step S104 to judge whether or not the bed temperature of the SCR catalyst 10 is equal to or lower than the temperature Ts2. When the negative judgment is made in this step, it is considered that the SCR catalyst 10 is already in the active state and the NOx purification rate is sufficiently high. Therefore, ECU 20 terminates this flow without executing the fuel supply aimed to increase the NOx purification rate of the exhaust gas purification apparatus.

On the other hand, when the affirmative judgment is made in step S104, ECU 20 proceeds to step S105 to judge whether or not the bed temperature of the SCR catalyst 10 is not less than the temperature Ts1. When the negative judgment is made in this step, ECU 20 proceeds to step S106 to judge whether or not the bed temperature of the oxidation catalyst 5 is equal to or lower than the temperature Td2.

When the affirmative judgment is made in step S106, it is meant that the bed temperature of the oxidation catalyst 5 belongs to the temperature range from the temperature Td1 to the temperature Td2 and the bed temperature of the SCR catalyst 10 is lower than the temperature Ts1, in combination with the previous judgment results. Thus, ECU 20 proceeds to step S107 to execute the HC-SCR mode so that the NOx purification rate of the oxidation catalyst 5 is increased. When Step S107 is executed, this flow is terminated.

On the other hand, when the negative judgment is made in step S106, it is meant that the bed temperature of the oxidation catalyst 5 is higher than the temperature Td2 and the bed temperature of the SCR catalyst 10 is lower than the temperature Ts, in combination with the previous judgment results. Therefore, ECU 20 proceeds to step S108 to execute the SCR temperature raising mode without $NO_2$ guard. By this, the NOx purification rate of the SCR catalyst 10 is increased. When Step S108 is executed, this flow is terminated.

Note that when the affirmative judgment is made in step S105, it is meant that the bed temperature of the oxidation catalyst 5 is not less than the temperature Td1 and the bed temperature of the SCR catalyst 10 is within the temperature range from the temperature Ts1 to the temperature Ts2, in combination with the previous judgment results. In other words, the SCR catalyst 10 is in the transient state. Therefore, ECU 20 proceeds to step S109 to execute the SCR temperature raising mode with $NO_2$ guard. By this, the NOx purification rate can be increased by raising the temperature of the SCR catalyst 10, while approximating the NOx purification rate of the SCR catalyst 10 in the transient state to the predetermined purification rate. When Step S109 is executed, this flow is terminated.

As described above, according to this embodiment, in the case of the bed temperature of the oxidation catalyst 5 being equal to or higher than the active temperature, the control mode of the fuel supply control is selectively executed on the basis of the bed temperatures of the oxidation catalyst 5 and the SCR catalyst 10. Therefore, is possible to appropriately perform the fuel supply so that the NOx purification rate of the catalyst with which the NOx purification ability is more exhibited is increased. As a result, it is possible to increase the NOx purification rate of the entire exhaust gas purification apparatus.

[Second Embodiment]

Figure 6:
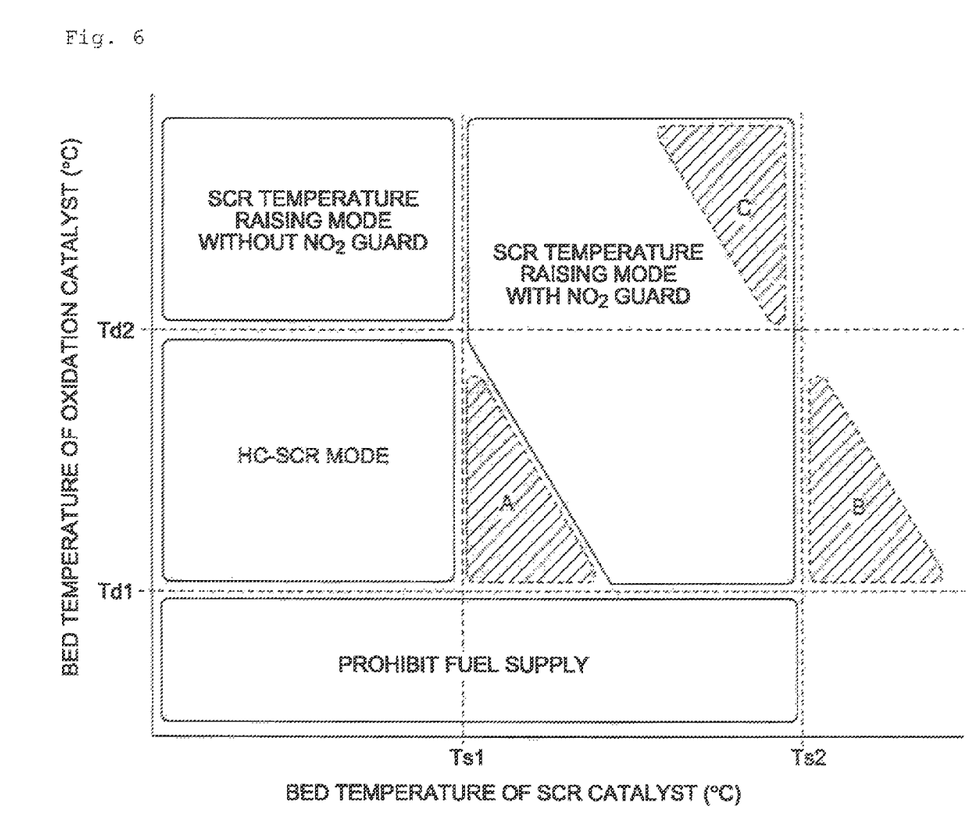
FIG. 6 illustrates control modes of the fuel supply according to a second embodiment of the present invention.

Next, an explanation will be made about a second embodiment as a modified embodiment of the present invention. The schematic arrangement of the internal combustion engine and the exhaust gas purification apparatus according to this embodiment is the same as or equivalent to that described in the first embodiment. An explanation will be made below with reference to FIG. 6 principally about the feature different from that of the first embodiment in relation to the fuel supply control according to this embodiment. Note that FIG. 6 illustrates the control mode of the fuel supply control executed by ECU 20 in the second embodiment.

In this embodiment, in the case where the bed temperature of the oxidation catalyst 5 is within the range from the temperature Td1 to the temperature Td2, the HC-SCR mode is executed in place of the SCR temperature raising mode with $NO_2$ guard when the SCR catalyst 10 is in the transient state and it is predicted that the NOx purification rate of the oxidation catalyst 5 in the case of the HC-SCR mode being executed will be higher than the NOx purification rate of the SCR catalyst 10 in the case of the SCR temperature raising mode with $NO_2$ guard being executed.

In the case the bed temperature of the oxidation catalyst 5 being within the range from the temperature Td1 to the temperature Td2, when the SCR catalyst 10 is in the transient state, both of the oxidation catalyst 5 and the SCR catalyst 10 are in such a state that the ability to reduce NOx can be effectively exhibited provided that an appropriate amount of the fuel is supplied. According to this embodiment, it is possible to selectively execute the control in which the NOx purification rate of the oxidation catalyst 5 is predicted to be higher, and therefore the NOx purification rate of the entire exhaust gas purification apparatus can surely be increased. Note that the prediction may be performed on the basis of the bed temperature of the oxidation catalyst 5 and/or the bed temperature of the SCR catalyst 10 estimated by ECU 20, etc. For example, the closer to the temperature Ts1 the bed temperature of the SCR catalyst 10 is, the lower the NOx purification rate of the SCR catalyst 10 is. Therefore, when the bed temperature of the oxidation catalyst 5 and the bed temperature of the SCR catalyst 10 are within the area A shown in FIG. 6, the NOx purification rate of the oxidation catalyst 5 is predicted to be higher than the NOx purification rate of the SCR catalyst 10.

Further, in this embodiment, the SCR temperature raising mode with $NO_2$ guard is executed when the bed temperature of the SCR catalyst 10 is predicted to be lowered on account of the bed temperature of the oxidation catalyst 5 to cause transition to the transient state when the bed temperature of the SCR catalyst 10 is higher than the temperature Ts2, in addition to the SCR temperature raising mode with $NO_2$ guard executed if the SCR catalyst 10 is in the transient state when the bed temperature of the oxidation catalyst 5 is equal to or higher than the temperature Td1.

Even if the SCR catalyst 10 is in the active state on account of the bed temperature of the SCR catalyst 10 of equal to or higher than the temperature Ts2, when the bed temperature of the oxidation catalyst 5 is sufficiently lower than the bed temperature of the SCR catalyst 10, it is feared that the exhaust gas having a low temperature, which flows out from the oxidation catalyst 5, may flow into the SCR catalyst 10 arranged on the downstream side to lower the bed temperature of the SCR catalyst 10. Accordingly, it is feared that the bed temperature of the SCR catalyst 10 may be lower than the temperature Ts2, and the SCR catalyst 10 may be transited to the transient state. In other words, when the bed temperature of the oxidation catalyst 5, which is estimated by ECU 20, is sufficiently lower than the bed temperature of the SCR catalyst 10 (for example, when the bed temperature of the oxidation catalyst 5 and the bed temperature of the SCR catalyst 10 are in the area B shown in FIG. 6), the bed temperature of the SCR catalyst 10 is predicted to be lowered on account of the bed temperature of the oxidation catalyst 5 to cause transition to the transient state. According to this embodiment, even in the case of the situation as described above, the SCR temperature raising mode with $NO_2$ guard is previously executed. Accordingly, the decrease in the NOx purification rate of the SCR catalyst 10, which would be otherwise caused after the transition to the transient state, is suppressed beforehand. As a result, it is possible to suppress the decrease in the NOx purification rate of the exhaust gas purification apparatus.

Further, in this embodiment, in cases where the bed temperature of the oxidation catalyst 5 is equal to or higher than the temperature Td1, when the SCR catalyst 10 is in the transient state and the bed temperature of the SCR catalyst 10 is predicted to be raised on account of the bed temperature of the oxidation catalyst 5 to cause transition to the active state, the SCR temperature raising mode with $NO_2$ guard is prohibited.

In cases where the SCR catalyst 10 is in the transient state on account of the bed temperature of the SCR catalyst 10 being in the range from the temperature Ts1 to the temperature Ts2, when the bed temperature of the oxidation catalyst 5 is sufficiently higher than the bed temperature of the SCR catalyst 10, the bed temperature of the SCR catalyst 10 is predicted to be raised because the high temperature exhaust flowed out from the oxidation catalyst 5 inflows into the SCR catalyst 10. In other words, when the bed temperature of the oxidation catalyst 5 estimated on the basis of the output signal from the first exhaust gas temperature sensor 6, is sufficiently higher than the bed temperature of the SCR catalyst 10 estimated on the basis of the output signal from the second exhaust gas temperature sensor 12 (for example, when the bed temperature of the oxidation catalyst 5 and the bed temperature of the SCR catalyst 10 are in the area C shown in FIG. 6), the bed temperature of the SCR catalyst 10 is predicted to be raised to cause transition to the active state on account of the bed temperature of the oxidation catalyst 5. According to this embodiment, the SCR temperature raising mode with NO₂ guard is prohibited in such cases. Therefore, it is possible to reduce the fuel supply amount.

DESCRIPTION OF THE REFERENCE SIGNS

1: internal combustion engine
2: fuel injection valve
3: exhaust gas passage
4: fuel addition valve
5: oxidation catalyst
10: SCR catalyst
20: ECU.

The invention claimed is:

1. An exhaust gas purification apparatus for an internal combustion engine, comprising:
an oxidation catalyst that is provided in an exhaust gas passage of the internal combustion engine and has an oxidation ability, the oxidation catalyst reducing NOx contained in an exhaust gas by using fuel supplied by the aid of the exhaust gas as a reducing agent when a catalyst temperature belongs to a predetermined temperature range equal to or higher than an active temperature thereof;
a fuel supply unit that supplies the fuel to the oxidation catalyst by the aid of the exhaust gas flowing into the oxidation catalyst;
a selective catalytic reduction catalyst that is provided in the exhaust gas passage on a downstream side of the oxidation catalyst and reduces NOx contained in the exhaust gas by using ammonia as a reducing agent;
a reducing agent supply unit that supplies ammonia or a precursor of ammonia to the selective catalytic reduction catalyst by the aid of the exhaust gas flowing into the selective catalytic reduction catalyst; and
an electronic control unit that controls a fuel supply amount by the fuel supply unit, wherein the control unit executes:
first control of controlling the fuel supply amount by the fuel supply unit so that NOx is reduced by the oxidation catalyst when the selective catalytic reduction catalyst is in an inactive state when the temperature of the oxidation catalyst belongs to the predetermined temperature range; and
second control of controlling the fuel supply amount by the fuel supply unit so that a temperature of the exhaust gas flowing into the selective catalytic reduction catalyst is raised by oxidation of the fuel in the oxidation catalyst irrespective of an NOx purification rate of the selective catalytic reduction catalyst when the selective catalytic reduction catalyst is in the inactive state in cases where the temperature of the oxidation catalyst exceeds the predetermined temperature range.

2. The exhaust gas purification apparatus for the internal combustion engine according to claim 1, wherein the control unit executes, when the selective catalytic reduction catalyst is in a transient state between an active state and the inactive state in cases where the temperature of the oxidation catalyst is equal to or higher than the active temperature thereof, third control of controlling the fuel supply amount by the fuel supply unit so that the oxidation of the fuel by the oxidation catalyst causes the temperature of the exhaust gas flowing into the selective catalytic reduction catalyst to rise, while keeping a ratio between nitrogen monoxide and nitrogen dioxide contained in the exhaust gas flowing into the selective catalytic reduction catalyst a predetermined ratio at which the NOx purification rate brought about by the selective catalytic reduction catalyst in the transient state is a predetermined purification rate.

3. The exhaust gas purification apparatus for the internal combustion engine according to claim 2, wherein the control unit executes the first control in place of the third control when the selective catalytic reduction catalyst is in the transient state and the NOx purification rate of the oxidation catalyst upon executing the first control is predicted to be higher than the NOx purification rate of the selective catalytic reduction catalyst upon executing the third control when the temperature of the oxidation catalyst is equal to or higher than the active temperature thereof.

4. The exhaust gas purification apparatus for the internal combustion engine according to claim 2, wherein the control unit executes the third control when the selective catalytic reduction catalyst is in the transient state in cases where the temperature of the selective catalytic reduction catalyst is higher than the active temperature thereof and also executes the third control when it is predicted that the temperature of the selective catalytic reduction catalyst is lowered on account of the temperature of the oxidation catalyst, causing the selective catalytic reduction catalyst to enter to the transient state on account of the temperature of the oxidation catalyst, in cases where the temperature of the selective catalytic reduction catalyst is higher than the active temperature thereof.

5. The exhaust gas purification apparatus for the internal combustion engine according to claim 2, wherein the control unit prohibits the third control when the selective catalytic reduction catalyst is in the transient state and it is predicted that the temperature of the selective catalytic reduction catalyst is raised on account of the temperature of the oxidation catalyst, causing the selective catalytic reduction catalyst to enter to the active state, in cases where the temperature of the oxidation catalyst is equal to or higher than the active temperature thereof.

* * * * *